Patented Apr. 23, 1929.

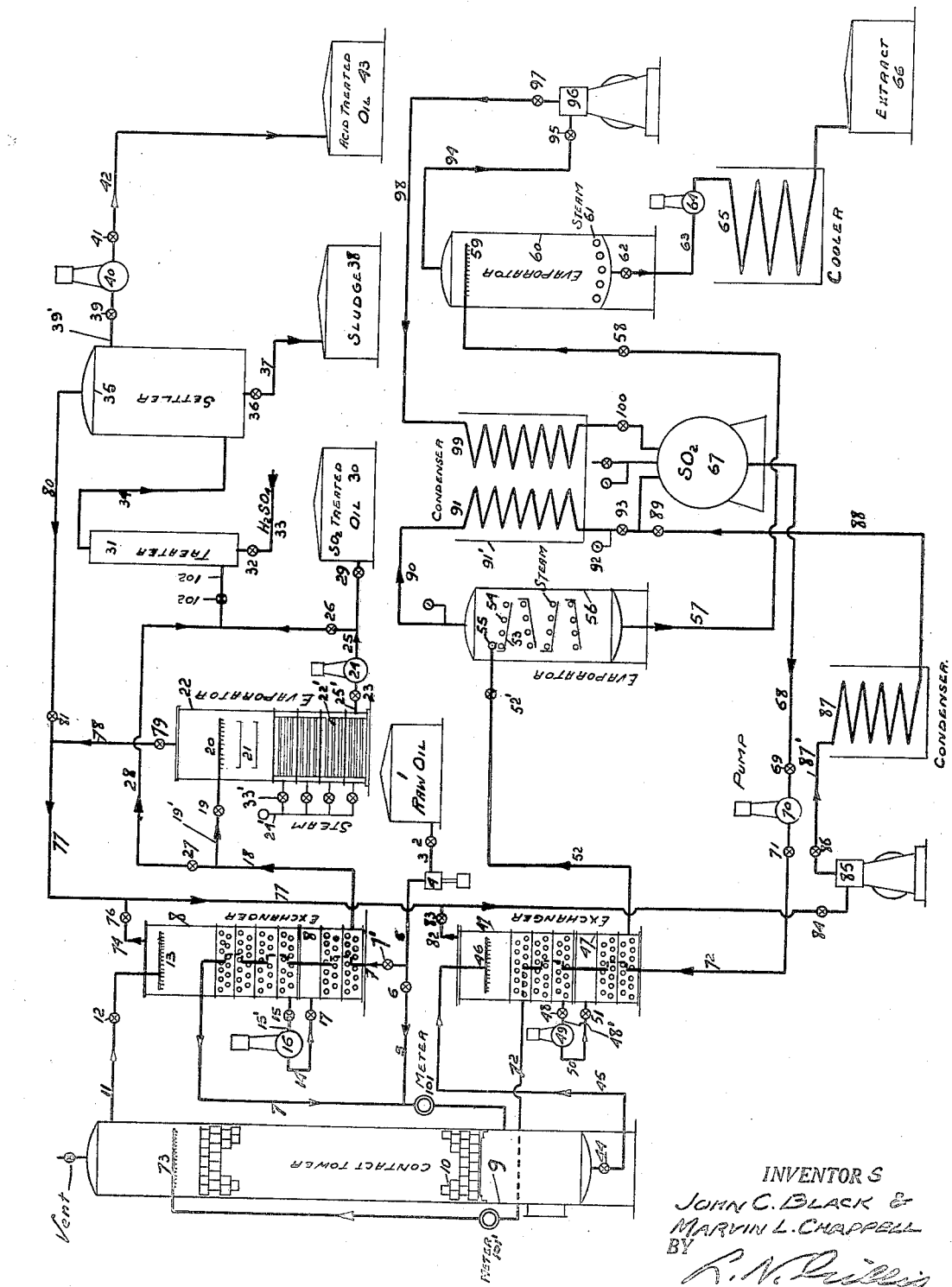

1,710,201

UNITED STATES PATENT OFFICE.

JOHN C. BLACK AND MARVIN L. CHAPPELL, OF LOS ANGELES, CALIFORNIA, ASSIGNORS TO PAN AMERICAN PETROLEUM COMPANY, OF LOS ANGELES, CALIFORNIA, A CORPORATION OF CALIFORNIA.

PROCESS OF PURIFYING HYDROCARBONS.

Application filed May 28, 1927. Serial No. 194,971.

This invention is a continuation in part of the application of John C. Black and Marvin L. Chappell, Serial No. 181,564, filed April 6, 1927, process of treating hydrocarbons, and relates to the purification of hydrocarbons, more specifically referring to the treatment of petroleum oil distillates derived by distillation of petroleum oils of a carbocyclic, asphalt, or mixed base series, such for example as distillates derived from a California, Texas, Mexican, South American or Russian crude petroleum oil.

One of the principal objects of this invention is to accomplish a purification of petroleum oil distillates for the production of lamp oils, transformer oils, lubricating oils, spray oils, mineral medicinal oils, and other products of like composition, by a sequence of operations, rapidly, economically, and without loss of the desired stock.

Another object of the invention is to provide a continuous system for the extraction of hydrocarbons containing a low percentage of hydrogen and sulphur bearing constituents, from petroleum oil distillates containing the same, by a selective treatment of said petroleum oil distillate at low temperatures, with liquid sulphur dioxide followed by a treatment with sulfuric acid, or sulfuric trioxide gas, in the presence of liquid sulphur dioxide, or other reducing agents as, for instance, hydrogen, carbon monoxide, or the like, and at temperatures below 60° F.

Another object of the invention is to produce refined oils of the highest purity with a minimum loss in treatment of the petroleum oil distillate.

Another object of the invention is to provide a counter-flow method for treating hydrocarbon oils with liquid sulphur dioxide, in which a sufficient time contact between the oil and liquid sulphur dioxide is maintained by means of a high treating tower in a one stage operation, so that the liquid sulphur dioxide will be completely and most efficiently utilized for the purification of hydrocarbon oils without the removal of substantially any of the desired refined hydrocarbons.

By well-known methods in the treatment of petroleum oil distillates derived from an asphalt or mixed base crude petroleum oil, it is usually necessary to employ large amounts of sulfuric acid or fuming sulfuric acid at elevated temperatures, or sulphur trioxide gas at normal temperatures to extract therefrom the sulphur bearing hydrocarbons and hydrocarbons containing a high percentage of carbon, such for example, as hydrocarbons of the unsaturated and aromatic series.

Another well-known method for the purification of petroleum oil distillates derived from an asphalt or mixed base crude petroleum oil is the liquid sulphur dioxide method in which petroleum oil distillates are commingled with liquid sulphur dioxide at low temperatures, permitted to settle, and the liquid sulphur dioxide containing the extracted oil, separated. This method, however, does not completely purify the petroleum oil distillates, which must be further treated with sulfuric acid or fuming sulfuric acid at elevated or normal temperatures to obtain the desired color and grade. Also this method involves considerable loss of the desired stock due to the inability of the liquid sulphur dioxide to make a complete separation of the desired hydrocarbons from the undesired hydrocarbons, whereby a part of the undesired hydrocarbons is left in the treated petroleum oil distillates, and a part of the desired hydrocarbons is left in the extracted hydrocarbons, also in case a petroleum oil distillate is purified with sulfuric or fuming sulfuric acid at normal or elevated temperatures, there is considerable loss of the desired stock due to oxidation and excessive sulphonation.

On certain petroleum oil distillates derived from a California asphalt or mixed base petroleum oil, it was determined that by the above well-known methods of either treating with fuming sulfuric acid at elevated temperatures or treating with liquid sulphur dioxide at low temperature, followed by a treatment with sulfuric acid at normal or elevated temperatures, a yield of finished high grade transformer oil could not be obtained without a loss of from 30 to 35 per cent of the distillate treated, while by our improved method, a finished yield of the same grade of transformer oil was obtained with a loss of only 22 to 29 per cent of the distillate treated, thereby making a saving of approximately 8 per cent of the distillate treated, which has heretofore been lost or rendered unusable for a transformer oil stock. In like manner it was found that a similar saving could be effected in the manufacture of lamp oils, lubricating oils, medicinal oils and spray oils.

By our invention, petroleum oil distillate derived from an asphalt or mixed base crude petroleum oil is first treated with liquid sulphur dioxide at low temperatures, preferably at the temperature at which $SO_2$ has substantially no vapor pressure, in quantities sufficient to extract a major portion of the undesired hydrocarbons without any substantial extraction of the desired hydrocarbons, after which the partly purified petroleum oil distillate containing dissolved liquid sulphur dioxide is separated from the surplus liquid sulphur dioxide containing the extracted undesired hydrocarbons, and then treated with sulfuric acid or fuming sulfuric acid in quantities sufficient to complete the purification, the acid treatment of the said partly purified petroleum oil distillate being performed at temperatures below 60° F. and in the presence of dissolved liquid sulphur dioxide, whereby a selective treatment is obtained without the extraction or chemical destruction of substantially any of the desired refined stock, which is due to lower temperature treatments with sulfuric acid in the presence of a reducing agent ($SO_2$) thereby preventing oxidation and excessive sulphonation.

From the foregoing preliminary explanation, it will be understood that our invention consists in the purification of petroleum oil distillates, first by extracting a part of the undesired hydrocarbons with liquid sulphur dioxide at low temperatures, and then immediately finishing the purification completely at a low temperature in the presence of dissolved liquid sulphur dioxide, by the employment of sulfuric acid, fuming sulfuric acid, or sulphur trioxide, whereby in the first treatment excessive extraction of a desired hydrocarbon is prevented, and in the second treatment the excessive sulphonation and oxidation of the desired oil stock is prevented.

The preferred embodiment of our invention will now be explained by reference to the accompanying drawing which is a diagrammatical representation of a preferred apparatus for carrying out the operations of the present invention.

In the drawing, 1 represents generally an oil tank containing the petroleum oil distillate to be treated. Pipe 3 controlled by a valve 2 connects the suction side of a pump 4 which discharges into pipe 5. Pipe 5 is connected to a branch line 7, controlled by the valves 6 and 7'; and conduct the treated oil through an exchanger 8, or the oil may be directly discharged from pipe 5 into a pipe 7 which is connected to contact tower 9, the flow of oil passing through a meter 101. Exchanger 8 is also connected to pipe 7, so that all or a portion of the oil may be passed through the exchanger 8. Connected to the exchanger 8 is a pipe 15', controlled by a valve 15, which is connected to the suction side of a pump 16. Pump 16 discharges through the pipe 14, controlled by a valve 17, and back into the lower division of the exchanger 8.

10 indicates a packing material in the contact tower 9, by means of which an even distribution of the liquids passing through the tower may be obtained. A pipe 11 connects the contact tower 9 at the top and leads through the top of exchanger 8 ending in a spray line 13, controlled by a valve 12. A pipe 18 is connected to the exchanger 8 at the bottom, controlled by a valve 27 and a valve 19, so that the flow of oil may be conducted directly to the evaporator 22 or may be conducted directly to a storage 30 passing through the pipe 28 controlled by the valves 26 and 29, or the oil may be conducted directly into the evaporator 22 passing through the pipe 19' which ends in a spray line 20. The evaporator 22 is provided with steam coil sections 22' controlled by valves 33' and connected to a steam line 24' which leads to a source of steam supply not shown. The evaporator 22 is also provided with distributing trays 21. A pipe 25' is connected to evaporator 22 at the bottom and leads to the suction side of the pump 24, controlled by a valve 23. Pump 24 discharges through the pipe 25 and into the treated oil tank 30. The pipe 78 connects the evaporator 22 at the top, controlled by a valve 79, and is connected to the main pipe 77, which leads to the suction side of an exhauster 85, controlled by valves 84 and 86. The exhauster 85 discharges into a pipe 87', controlled by valve 86, which is connected to a condenser coil 87. The condenser coil 87 is connected to a pipe 88 at the bottom and leads to a sulphur dioxide storage tank 67, controlled by the valve 89.

The sulphur dioxide storage tank 67 is connected at the bottom with a pipe 68, which is connected to the suction side of a pump 70, controlled by the valves 69 and 71. The pump 70 discharges into a pipe 72 controlled by a valve 71 which leads the liquid sulphur dioxide into the exchanger 47. The exchanger 47 is connected to a pipe 72 which leads through a meter 101', and then into the top of contact tower 9 ending in a spray line 73.

Contact tower 9 is connected at the bottom by a pipe 45, controlled by a valve 44, which leads into the top of exchanger 47 ending in the spray line 46. A pipe 48' is connected to exchanger 47 controlled by a valve 48, and is connected to the suction side of a pump 49 which discharges into pipe 50 and back into the lower part of exchanger 47 controlled by valve 51. A pipe 52 is connected to an evaporator 56 controlled by valve 52' ending in spray line 55. The evaporator is provided with steam heating coils 54 lying in distributing trays 53. A pipe 90 is connected to evaporator 56 at the top and connects the condenser coil 91 in the condenser box 91', which leads to the sulphur dioxide storage tank 67. 92 is a pressure gauge connected to the pipe 90 to indicate the pressure on the system. 93 is a valve controlling the flow of condensed SO₂ to the storage tank 67.

Connected to the bottom of evaporator 56 is a pipe 57, controlled by valve 58, and connected to a second evaporator 60 ending in a spray pipe 59. The evaporator 60 is provided with steam coils 61 which lead to a source of steam not shown. A pipe 63 is connected to evaporator 60 at the bottom, controlled by a valve 62 and leads to the suction side of a pump 64. Pump 64 discharges through a cooler 65 and into an extract tank 66. 94 is a pipe connected to an evaporator 60 at the top and conducts the gaseous sulphur dioxide into the suction side of a compressor 96, which is controlled by a valve 97. Pipe 98 passes through a cooler 91' and through a condenser coil 99. Condenser coil 99 is connected to sulphur dioxide storage tank 67 controlled by valve 100.

A branch pipe 102 controlled by a valve 102' connects pipe 28 with a treater 31. Treater 31 is connected at the bottom by a pipe 33 controlled by a valve 32, which leads to a source of sulfuric acid not shown. The treater 31 is connected at the top by a pipe 34 which is connected to a settler 35 at the bottom. Drain pipe 37 of the settler 35 is connected to a sludge tank 38, controlled by a valve 36. Pipe 39', controlled by valve 39, connects settler 35 to the suction side of pump 40. Pump 40 discharges the acid treated oil into a tank 43 passing through the pipe 42 controlled by the valve 41. Settling tank 35 is connected at the top by a pipe 80, which leads to the suction side of a compressor 85. A branch pipe 74, controlled by a valve 76, connects the pipe 80 to exchanger 8, at the top. A pipe 82 also connects the pipe 80 to exchanger 47 controlled by valve 83. A pipe 78 connects evaporator 22 with the pipe 80 controlled by valve 79.

The preferred process as carried out in the apparatus described is as follows:

Petroleum oil distillate, preferably that derived from an asphalt or mixed base crude petroleum oil, contained in tank 1 is caused to flow under pump pressure through the exchanger 8, which is a tubular heat exchanger in any well-known type. The oil passing through the exchanger 8 is cooled to the required degree, approximately 17° F. by means of a counterflow heat exchange from the cold treated oil coming from the contact tower 9, which passing through the pipe 11 and into the exchanger 8 through the spray pipe 13 controlled by the valve 12. The cooled oil passes from the exchanger 8 through a meter 101, and then into the bottom of the contact tower 9. In contact tower 9 the cooled oil passes upward and through the packing 10 and meets in counterflow treatment liquid sulphur dioxide which is being continuously introduced into the top of the tower through the spray pipe 73 the liquid sulphur dioxide having been subjected to a temperature exchange and cooling so that it will also be at approximately the same temperature as the oils to be treated (17° F.). The sulphur dioxide treated oil containing dissolved sulphur dioxide passes through the exchanger 8 where it enters into a heat exchange with the incoming oil to be treated, the temperature of the treated oil being still further reduced, if necessary, by evaporating a portion of the dissolved sulphur dioxide present in the oil by taking suction on the top of exchanger 13 with compressor 85 through pipes 77 and 74 controlled by valves 76 and 84. The sulphur dioxide treated oil passes from the bottom of exchanger 8 into the top of evaporator 22, passing through the spray pipe 20 controlled by the valve 19. In evaporator 20 the balance of the sulphur dioxide contained in the treated oil is eliminated by evaporation, the required temperature being maintained in the evaporator by means of steam coils 22'; also a partial vacuum is maintained on the said evaporator 22. The sulphur dioxide treated oil free from any dissolved sulphur dioxide is discharged into the treated oil tank 30 by the pump 24 passing through the pipe 25 controlled by valves 23 and 29.

Preferably, however, the sulphur dioxide treated oil containing dissolved liquid sulphur dioxide is discharged directly into the treater 31, passing through the pipe 28, valve 19 being closed, and valve 27 being open. In the treater 31 the sulphur dioxide treated oil still at a relatively low temperature is commingled with sulfuric acid in quantities sufficient to complete the purification of the oil. The commingled sulphur dioxide treated oil and sulfuric acid passes from the treater 31 into the settler 35 where the acid products of reaction separate from the treated oil and are drawn off into the sludge tank 38, and the treated oil, substantially free of sludge, is continuously drawn off at the top of the settler 35 and pumped into the oil tank 43. The acid treated oil contained in tank 43 is then finished by methods well known in the art.

The sulphur dioxide in the storage tank 67 is continuously passed through exchanger 47 where the temperature is reduced to the required degree by an exchange with the outgoing liquid sulphur dioxide extract coming from the contact tower 9 through pipe 45, controlled by the valve 44, and passing into the said exchanger 47 through the spray pipe 46. At the same time a partial vacuum is maintained on the top section of exchanger 47 so that a portion of the surplur dioxide contained in the extract will evaporate and reduce the temperature to such an extent that the outgoing liquid sulphur dioxide will be cooled to the necessary treating temperature (17° F.). The cooled liquid sulphur dioxide passes out of the exchanger 47 through the pipe 72 and is introduced into the contact tower through the spray pipe 73, the flow being regulated by means of meter 101'. The cooled sulphur dioxide passes down through the contact tower 9 in counterflow treatment with the upcoming cool petroleum oil distillate, whereby the major portion of the aromatic and unsaturated hydrocarbons are dissolved by the liquid sulphur dioxide. The liquid sulphur dioxide containing the dissolved aromatic and unsaturated hydrocarbons pass out of the contact tower 9 at the bottom and through the exchanger 47 where a temperature exchange takes place between the incoming pure liquid sulphur dioxide and this sulphur dioxide extract. In the exchanger 47 a portion of the liquid sulphur dioxide present in the extract is evaporated by means of a partial vacuum in the evaporator section of said exchanger 47. The sulphur dioxide vapors pass through pipe 82 and then into main pipe 77, and into the suction side of compressor 85. The sulphur dioxide gas passing into compressor 85 is compressed, condensed to a liquid and conducted into the storage tank 67. The sulphur dioxide extract passes from the exchanger 47 through a pipe 52 to an evaporator 56 under a pressure of approximately 100 pounds, and is therein heated to a temperature sufficient to vaporize the major portion of the sulphur dioxide. The extract in evaporator 56 passes from tray to tray, whereby the sulphur dioxide is vaporized, and passes into a pipe 90, which leads to a condenser coil 91. The sulphur dioxide gas passing through the condenser 91 at a pressure of substantially 100 pounds, is condensed and liquefied, from whence it passes into the sulphur dioxide storage tank 67. The extract from which the major portion of the liquid sulphur dioxide has been evaporated is conducted from the evaporator 56 through a pressure reducing valve 58 and into a second evaporator 60 where the balance of the sulphur dioxide is taken off by the application of heat and vacuum. From evaporator 60 the extracted aromatic and unsaturated hydrocarbon oils substantially free of sulphur dioxide are passed through a cooler 65 and into a storage extract tank 66.

The treated petroleum oil free of undesirable hydrocarbons in tank 43 is finished by processes well known in the art which may be neutralization with caustic soda, or a redistillation followed by a light treatment with sulfuric acid, and a final caustic neutralization. With transformer oil which has been efficiently separated from the higher boiling hydrocarbons a redistillation and subsequent acid treatment will not generally be necessary.

The acid treatment of petroleum distillates after the liquid sulphur dioxide extraction operation may be carried out with the employment of 66° Bé. sulfuric acid or 15 per cent fuming sulfuric acid, in the presence of a reducing agent such as dissolved sulphur dioxide.

The quantity of sulfuric acid employed in this operation may range from as low as $\frac{1}{10}$ of a pound to as high as 4 pounds per gallon of oil treated, this depending upon the quality of the stocks to be treated and the product desired and in like case the quantity of liquid sulphur dioxide required to remove the major portion of the aromatic and unsaturated hydrocarbons may vary from as low as $\frac{1}{4}$ volume to as high as 4 volumes of liquid sulphur dioxide per gallon of petroleum oil distillate to be treated.

While the process herein described is well adapted for carrying out the objects of the present invention, it is to be understood that various modifications and changes may be made without departing from the spirit of the invention, and the invention includes all such modifications and changes as come within the scope of the appended claims.

We claim:

1. A process of purifying hydrocarbon oils, which consists in treating the same with liquid sulfur dioxide at low temperatures, and in quantities sufficient to dissolve a portion of the constituents to be separated, dissolving that portion of the contituents to be separated therein, separating the two liquids and then treating the partially purified hydrocarbon oils at low temperatures with sulfuric acid in the presence of dissolved sulfur dioxide, in quantities sufficient to convert the balance of the constituents to be separated into sulfo-acids, and then separating the purified hydrocarbon oil from the sulfo-acids and sulfur dioxide.

2. A process of purifying hydrocarbon oils, which consists in treating the same with liquid sulphur dioxide at low temperatures and in quantities sufficient to dissolve a portion of the constituents to be separated, dissolving constituents of the same therein, separating the two liquids and then treating the partially purified hydrocarbon oils at low temperatures with sulfuric acid in the presence of dissolved sulfur dioxide to prevent any substantial oxidation thereof, separating the purified hydrocarbons from the dissolved sulfur dioxide and sulfo-acids, and separating the dissolved sulfur dioxide from the extracted constituents.

3. A continuous process of purifying hydrocarbon oils which consists in treating the same at low temperatures, by single counterflow contact with streams of liquid sulfur dioxide, in quantities sufficient to dissolve a part of the hydrocarbons containing high percentages of carbon, and sulfur bearing hydrocarbons; continuously dissolving the same therein; continuously separating the two liquids and continuously treating the partially purified hydrocarbon oil at low temperatures with sulfuric acid, in the presence of dissolved sulfur dioxide in quantities sufficient to convert substantially all the remaining sulfur bearing hydrocarbons and hydrocarbons having a relatively high percentage of carbon into sulfo-acids without any substantial sulphonation or oxidation of the hydrocarbons having relatively low percentages of carbon; separating the purified hydrocarbons from the sulfo-acids, and separating the dissolved sulfur dioxide from the purified hydrocarbons and extracted hydrocarbons.

4. A continuous process of purifying hydrocarbon oils, which consists in treating the same at temperatures below 32° F. in single counter-flow contact with liquid sulfur dioxide, in quantities sufficient to dissolve a part of the hydrocarbons containing high percentages of carbon, and sulfur bearing hydrocarbons; continuously dissolving the same therein; continuously separating the two liquids, and continuously treating the purified hydrocarbon oils at temperatures below 32° F. with sulfuric acid in the presence of dissolved sulfur dioxide, in quantities sufficient to convert substantially all the remaining sulfur bearing hydrocarbons and hydrocarbons having relatively high percentages of carbon, into sulfo-acids without any substantial sulphonation or oxidation of the hydrocarbons having relatively low percentages of carbon; separating the purified hydrocarbons from the sulfo-acids and separating the dissolved sulfur dioxide from the purified hydrocarbons and extracted hydrocarbons.

5. A process of purifying petroleum oils which consists in treating the same at low temperatures by counter-flow contact with liquid sulfur dioxide in a single treating tower of sufficient heighth to obtain a sufficient time contact between the hydrocarbon oil and liquid sulfur dioxide whereby substantially all of the aromatic and unsaturated hydrocarbons are extracted from the said hydrocarbon oil without substantially dissolving any of the desired hydrocarbons; separating the two liquids and treating the partially purified hydrocarbons at temperatures below 32° F. with sulfuric acid, in the presence of dissolved sulfur dioxide in quantities sufficient to convert subtantially all the remaining sulfur bearing hydrocarbons and hydrocarbons having relatively high percentages of carbon into sulfo-acids, without any substantial sulphonation or oxidation of the hydrocarbons having relatively lower percentages of carbons; separating the purified hydrocarbons from the sulfo-acids, and separating the dissolved sulfur dioxide from the purified hydrocarbons and extracted hydrocarbons.

6. That step in the process of refining petroleum oil distillates comprising, treating the same at low temperatures in single counter-flow contact with streams of liquid sulfur dioxide over a multiplicity of contact surfaces sufficient to cause the extraction of substantially all of the aromatic and unsaturated hydrocarbons from said petroleum oil distillate without substantially dissolving any of the saturated hydrocarbons, separating the two liquids and immediately treating the said separated cold saturated hydrocarbons without removal of dissolved sulphur dioxide therefrom, with sulphuric acid.

7. That step in the process of refining petroleum oil distillates comprising, treating the same at low temperatures in single counter-flow contact with streams of liquid sulfer dioxide over a multiplicity of contact surfaces sufficient to cause the extraction of substantially all of the aromatic and unsaturated hydrocarbons from said petroleum oil distillate without substantially dissolving any of the saturated hydrocarbons, separating the two liquids, and treating the purified hydrocarbon oils at low temperatures with sulfuric acid in the presence of dissolved sulfur dioxide in quantities sufficient to convert the remaining sulfur bearing hydrocarbons and hydrocarbons having a relatively high percentage of carbon into sulfo-acids without any substantial sulphonation or oxidation of the hydrocarbons having relatively lower percentages of carbon; separating the purified hydrocarbons from the sulfo-acids and separating the dissolved sulphur dioxide from the purified hydrocarbons and extracted hydrocarbons.

In testimony whereof we affix our signatures.

JOHN C. BLACK.
MARVIN L. CHAPPELL.